July 22, 1924.    B. R. BENJAMIN    1,501,937

TRACTION WHEEL

Filed May 26, 1922

Inventor.
Bert R. Benjamin,
By M. P. Doolittle
Atty

Patented July 22, 1924.

1,501,937

UNITED STATES PATENT OFFICE.

BERT R. BENJAMIN, OF OAK PARK, ILLINOIS, ASSIGNOR TO INTERNATIONAL HARVESTER COMPANY, OF CHICAGO, ILLINOIS, A CORPORATION OF NEW JERSEY.

TRACTION WHEEL.

Application filed May 26, 1922. Serial No. 563,962.

*To all whom it may concern:*

Be it known that I, BERT R. BENJAMIN, a citizen of the United States, residing at Oak Park, in the county of Cook and State of Illinois, have invented certain new and useful Improvements in Traction Wheels, of which the following is a full, clear, and exact specification.

My invention pertains to wheels and particularly to a traction wheel adapted for use as a drive wheel on tractors and agricultural implements such as mowers, binders, headers, etc.

Tractors and agricultural implements must be used on ground varying greatly in hardness and resistance. In order to obtain sufficient traction in soft ground, it has been customary to secure traction lugs to the periphery of the wheels which penetrate the ground and offer the necessary resistance to propel the vehicle or the operative parts of the implement. Such wheels usually have plain cylindrical rims to which the lugs are secured by bolts or rivets and, when operating in soft or sticky ground, the spaces between the lugs soon become packed full with earth or mud so that most of the traction is lost. Also when operating on firmer ground, the lugs penetrate to their full depth, if at all, which gives more traction than necessary and also cuts up or destroys the hard surfaces of roadways.

Having in mind the above noted difficulties, I have invented a traction wheel that will run on hard roads without injury thereto and yet is adapted without change to penetrate ground of varying degrees of hardness to a depth sufficient to afford the necessary traction, the contour of the wheel rim and relation of the lugs being such that the wheel is self-cleaning in sticky ground, that is, the spaces between the lugs will not pack full.

The traction wheels of agricultural implements are usually made from cast iron which has very little tensile strength but is comparatively strong under compression. In order that my improved wheel may be advantageously used in cast form, I have distributed the metal in the rim so that the tensile stresses are resisted by a relatively large cross-sectional area and the compression stresses resisted by a much smaller area, thereby distributing the metal so that the strength of the wheel is a maximum for any given size or weight.

In the drawings, I have illustrated an embodiment of my invention in what I now believe to be its best form.

Figure 1:
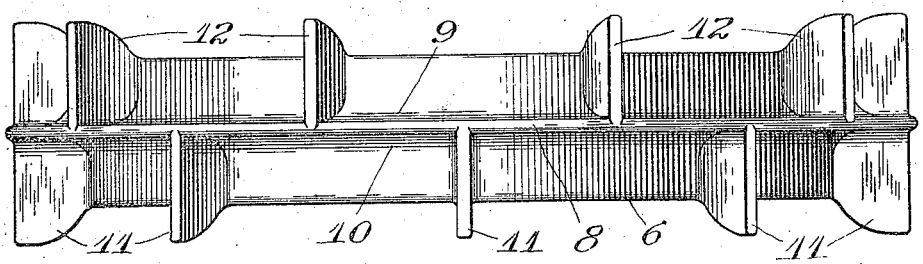
Fig. 1 is a plan view.
Figure 2:
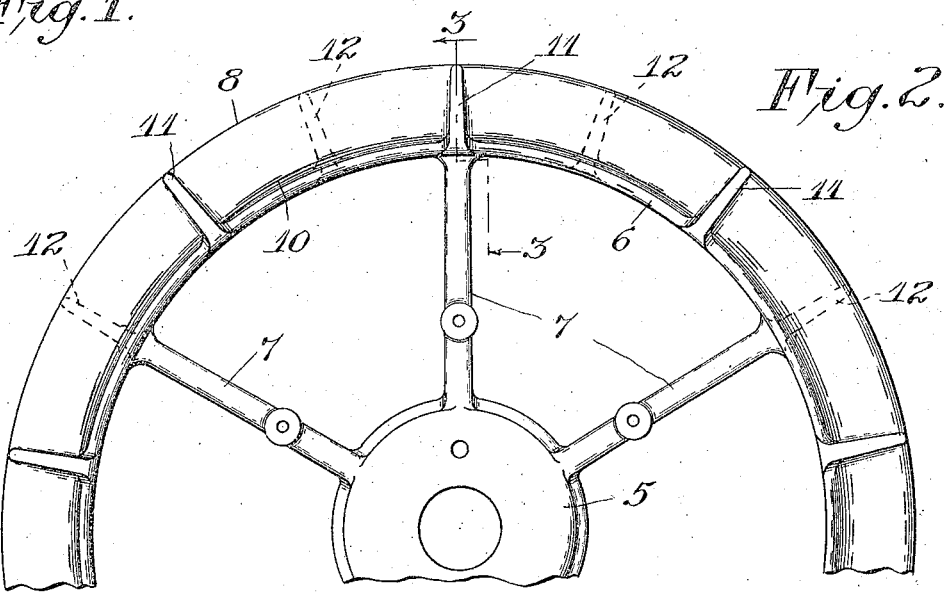
Fig. 2 is a part side elevation of a preferred form of wheel.

The wheel has a hub 5 and an annular rim 6 connected thereto by spokes 7 preferably cast integrally therewith. The rim has a central radial flange or rib 8 increasing slightly in thickness from its outer edge to the base where it is joined to the rim by fillets 9, 10. Traction lugs 11, 12 are provided on each side of the rib and are of the same height but project laterally beyond the edges of the rim.

When the wheel is traveling on the road or hard ground, it rides on the rib 8 and outer edges of the lugs with little or no penetration but when on softer ground, the rib 8 and lugs will penetrate to a sufficient depth to support the load, the resistance to penetration increasing with the depth and at the same time increasing the traction proportional to the depth that the lugs penetrate. Thus when the ground permits little penetration, its resistance will give sufficient traction to the lugs to propel the tractor or drive the implement. While if the ground be softer, the flange and lugs will sink deeper so that sufficient traction is obtained. If the ground be so soft that the penetration of the lugs and flange to their full depth is not sufficient to sustain the load, the rim 6 will stop further penetration and the broad lugs will afford sufficient traction for substantially all purposes.

When the wheel is being used on muddy or sticky ground, the earth will tend to gather in pyramidal form with its apex at the outer end of the rib and its base on the rim but it cannot fill up between the lugs because, as it accumulates, it will be crowded off at the edge of the rim when the rib again enters the ground.

Figure 4:
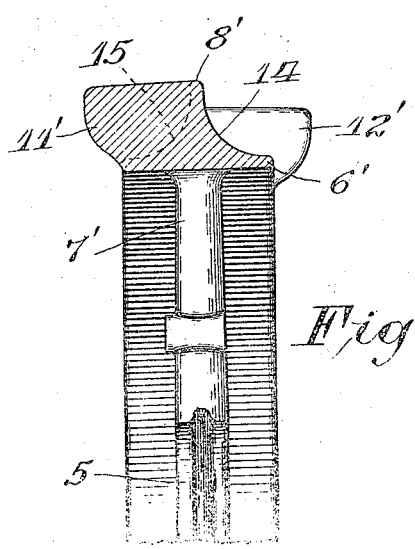
Fig. 4 is a section corresponding to Fig. 3 of a modified construction.
Figure 3:
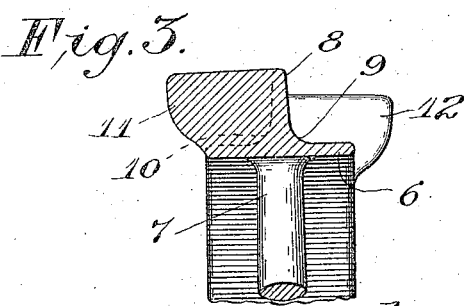
Fig. 3 is a section on the line 3—3 of Fig. 2.

In the modification shown in Fig. 4, the rim 6', spokes 7', rib 8', and lugs 11', 12' are similar in all respects to the corresponding parts just described but the fillets 9, 10 are replaced by fillets 14, 15 of a much larger radius which increases the thickness of the rib throughout its height and more gradually limits the penetration in different soils. Thus, under some soil conditions, the wheel first described may penetrate until the rim 6 bears on the soil while under the same conditions the modified form may penetrate only one-half the depth of the lugs due to the greater support offered by the thickened rib.

An important advantage of my invention is that it may be cast in a two-part mold without the use of cores of any kind, the cost of production being very much reduced thereby.

Another decided advantage is the distribution of the metal in the rim whereby maximum strength is secured. A cross section of the rim is substantially a T-section, the rim 6 or 6' which is under tension when the wheel is loaded forming the head of the T and the rib 8 or 8' which is under compression forming the leg of the T. The metal is therefore distributed so as to give maximum strength since the greater amount of metal distributed in the head of the T resists the tensile strains and the lesser cross section of the rib resists the stresses due to compression.

Having thus described my invention, what I claim as new and desire to secure by Letters Patent is:

1. As an article of manufacture, a traction wheel having a rim, an integral centrally disposed rib extending continuously around and radially outward from the rim, the sides of the rib merging with a gradual curve into the rim, and radial traction lugs secured in staggered relation on opposite sides of the rib and to the rim and extending laterally beyond the rim.

2. As an article of manufacture, a wheel having a rim cast in one piece, the rim being a T-section with the head of the T disposed inwardly and the leg extending radially outward and having traction lugs of the same height as the leg and extending laterally beyond the head on opposite sides.

3. As an article of manufacture, a traction wheel having a rim, a centrally disposed rib extending radially outward therefrom and of gradually decreasing thickness, radial traction lugs of the same height as the rib secured to opposite sides thereof and to the rim and extending laterally beyond the rim.

4. As an article of manufacture, a traction wheel having a rim, a centrally disposed rib of gradually decreasing thickness extending radially outward therefrom, the sides of the rib merging into the outer face of the rim, radial traction lugs of the same height as the rib secured to opposite sides thereof and to the rim and extending laterally beyond the rim.

In testimony whereof I affix my signature.

BERT R. BENJAMIN.